(12) United States Patent
Nishi

(10) Patent No.: US 10,415,666 B2
(45) Date of Patent: Sep. 17, 2019

(54) TUBULAR VIBRATION-DAMPING DEVICE

(71) Applicant: Sumitomo Riko Company Limited, Aichi (JP)

(72) Inventor: Naoki Nishi, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 15/872,355

(22) Filed: Jan. 16, 2018

(65) Prior Publication Data

US 2018/0172109 A1 Jun. 21, 2018

Related U.S. Application Data

(63) Continuation of application No. PCT/JP2016/087350, filed on Dec. 15, 2016.

(51) Int. Cl.
*F16F 1/38* (2006.01)
*F16F 15/08* (2006.01)
(Continued)

(52) U.S. Cl.
CPC ............. *F16F 15/08* (2013.01); *F16F 1/387* (2013.01); *F16F 1/3835* (2013.01); *F16F 1/3863* (2013.01); *F16F 3/087* (2013.01)

(58) Field of Classification Search
CPC ........ F16F 1/3835; F16F 1/3863; F16F 1/387; F16F 3/087; F16F 15/08
(Continued)

(56) References Cited

U.S. PATENT DOCUMENTS 863,887 A * 8/1907 Stuttle .................... F16L 21/06
24/279
4,707,149 A * 11/1987 Hahle ................ B60G 21/0551
384/276
(Continued)

FOREIGN PATENT DOCUMENTS

| JP | 2011-036005 | 2/2011 |
| JP | 2014-043916 | 3/2014 |
| JP | 2016-007971 | 1/2016 |

OTHER PUBLICATIONS

Official Communication issued in WIPO Patent Application No. PCT/JP2016/087350, dated Jan. 24, 2017 with English language translation.
(Continued)

*Primary Examiner* — Thomas W Irvin

(74) *Attorney, Agent, or Firm* — Greenblum & Bernstein, P.L.C.

(57) ABSTRACT

A tubular vibration-damping device including a vibration-damping device main unit and an outer tube member mounted onto an outer peripheral surface of the vibration-damping device main unit in a non-adhesive way. The outer tube member is constituted by a pair of division units mounted onto the vibration-damping device main unit from opposite sides. A first engaging part and a second engaging part are provided to butted ends of the division units and are engaged with each other by approach of the division units so that the division units are positioned with respect to each other in a direction of engagement of the first and second engaging parts. The division units are allowed to undergo relative displacement in a direction orthogonal to the direction of engagement of the first and second engaging parts.

8 Claims, 12 Drawing Sheets

(51) Int. Cl.
*F16F 3/087* (2006.01)
*F16F 1/387* (2006.01)

(58) Field of Classification Search
USPC .............................................. 267/139–141.4
See application file for complete search history.

(56) References Cited

U.S. PATENT DOCUMENTS

| | | | | |
|---|---|---|---|---|
| 5,013,166 | A * | 5/1991 | Domer | B60G 21/0551 267/276 |
| D317,558 | S * | 6/1991 | Daigle | D8/354 |
| 5,352,044 | A * | 10/1994 | Jordens | B60G 21/0551 384/140 |
| 5,437,439 | A * | 8/1995 | Brokamp | B60G 11/10 267/293 |
| 5,520,465 | A * | 5/1996 | Kammel | B60G 21/0551 267/293 |
| D412,336 | S * | 7/1999 | Bakoledis | D15/143 |
| 6,007,058 | A * | 12/1999 | Kokubo | F16B 17/008 248/634 |
| 6,142,923 | A * | 11/2000 | Bakoledis | B31B 50/00 492/30 |
| 6,755,405 | B2 * | 6/2004 | Kammel | F16F 1/3842 267/141.1 |
| 7,108,254 | B2 * | 9/2006 | Kumper | B60G 21/0551 267/276 |
| 7,458,726 | B2 * | 12/2008 | Seilheimer | F16C 43/02 29/898.058 |
| 8,038,540 | B2 * | 10/2011 | Hoeks | F16F 15/1442 188/379 |
| 8,882,092 | B2 * | 11/2014 | Jang | B60G 21/0551 267/141 |
| 9,200,690 | B2 * | 12/2015 | Eguchi | F16F 1/3863 |
| 9,259,812 | B1 * | 2/2016 | Blanton | B23P 19/04 |
| 9,546,705 | B2 * | 1/2017 | Ishimatsu | F16F 1/3835 |
| 9,702,411 | B2 * | 7/2017 | Polanco | F16C 43/02 |
| 2008/0067727 | A1 * | 3/2008 | Schwarz | B60G 21/0551 267/141.1 |
| 2013/0243358 | A1 * | 9/2013 | Stork | B25B 7/00 384/445 |
| 2014/0145384 | A1 * | 5/2014 | Tiilikainen | B62B 5/0009 267/141 |
| 2014/0210148 | A1 | 7/2014 | Eguchi et al. | |
| 2015/0239319 | A1 * | 8/2015 | Kuroda | B60G 21/055 267/141 |

OTHER PUBLICATIONS

Office Action issued in China Counterpart Patent Appl. No. 201680054563.6, dated May 27, 2019, along with an English translation thereof.
Notification of Transmittal of Copies of Translation of the Int'l Prelim. Report on Patentability (Form PCT/IB/338), dated Jun. 27, 2019.
Translation of Int'l Prelim. Report on Patentability (Form PCT/IB/237), dated Jun. 18, 2019.

* cited by examiner

TUBULAR VIBRATION-DAMPING DEVICE

INCORPORATED BY REFERENCE

This application is a Continuation of International Application No. PCT/JP2016/087350 filed Dec. 15, 2016, the disclosure of which is expressly incorporated herein by reference in its entirety.

BACKGROUND OF THE INVENTION

1. Field of the Invention

The present invention relates to a tubular vibration-damping device for use, for example, in automotive differential mounts, engine mounts, body mounts, member mounts, and the like.

2. Description of the Related Art

Conventionally, tubular vibration-damping devices have been known as one type of vibration damping connecting components interposed between components that make up a vibration transmission system in order to provide vibration damping linkage between the components. The application of such tubular vibration-damping devices in a differential mount and the like wherein the vehicle body (sub frame) supports an automotive differential gear in a vibration-damping manner, for example, is a topic of ongoing research. As shown in U.S. Publication No. US 2014/0210148 or the like, for example, this tubular vibration-damping device has a structure in which an inner shaft member and an outer tube member are elastically connected by a main rubber elastic body.

Meanwhile, the tubular vibration-damping device described in US 2014/0210148 includes the outer tube member divided into two units, namely, constituted by a pair of division units, and a vibration-damping device main unit constituted by the inner shaft member and the main rubber elastic body bonded to the outer circumferential surface of the inner shaft member. The pair of division units are mounted onto the vibration-damping device main unit from the opposite sides in the axis-perpendicular direction so as to clasp the vibration-damping device main unit. Also, the pair of division units, which are the divided two units of the outer tube member, are fixed by a fitting protrusion and a fitting hole being mated, welded, and the like with each other at their both circumferential ends.

However, with the structure disclosed in US 2014/0210148, in some cases, the fixing strength of the division units of the outer tube member is not sufficient. Specifically, with the structure in which the division units of the outer tube member are fixed to each other by the fitting protrusion being inserted into the fitting hole and being welded thereto after the insertion, there may be a case in which the fitting protrusion is broken due to vibration or impact during transportation, storage, and the like. This may cause the outer tube member not to be retained in a proper mounted state with respect to the vibration-damping device main unit. Besides, in the case in which the fitting protrusion inserted in the fitting hole is welded, the fitting protrusion is bonded by being re-hardened after being melted. Thus, the positions of the division units may be deviated during the melt of the fitting protrusion.

SUMMARY OF THE INVENTION

The present invention has been developed in view of the above-described matters as the background, and it is an object of the present invention to provide a tubular vibration-damping device with a novel structure which is able to connect a pair of division units that constitute an outer tube member with sufficient strength, as well as to position the division units to suitable relative positions at least when the device is mounted onto a vehicle.

The above and/or optional objects of this invention may be attained according to at least one of the following modes of the invention. The following modes and/or elements employed in each mode of the invention may be adopted at any possible optional combinations.

Specifically, a first mode of the present invention provides a tubular vibration-damping device comprising: a vibration-damping device main unit comprising an inner shaft member and a main rubber elastic body bonded to an outer circumferential surface of the inner shaft member; and an outer tube member having a tubular shape being mounted onto an outer peripheral surface of the vibration-damping device main unit in a non-adhesive way, the outer tube member comprising a pair of division units mounted onto the vibration-damping device main unit from opposite sides, the division units that are butted at each other including a first engaging part and a second engaging part provided to butted ends thereof, the first engaging part and the second engaging part being engaged with each other by approach of the division units, wherein the division units are positioned with respect to each other by engagement of the first engaging part and the second engaging part in a direction of engagement of the first engaging part and the second engaging part, and the division units are allowed to undergo relative displacement in a direction orthogonal to the direction of engagement of the first engaging part and the second engaging part.

With the tubular vibration-damping device of construction according to the first mode, by the pair of division units approaching each other, it is possible to engage the first engaging part and the second engaging part formed on the ends of the division units, so as to readily provide the tubular outer tube member mounted onto the outer peripheral surface of the vibration-damping device main unit in a non-adhesive way. Moreover, with the structure in which the division units are connected by engagement of the first engaging part and the second engaging part, the connecting strength of the division units can be readily set as needed in the direction of engagement of the first engaging part and the second engaging part, which is the direction of butting of the ends of the division units, thereby connecting the division units with sufficient strength.

Furthermore, in the direction orthogonal to the direction of engagement of the first engaging part and the second engaging part, the division units are allowed to undergo relative displacement, thereby preventing the division units from being fixed in a state of deviation with respect to each other in the axial direction or in the axis-perpendicular direction. Therefore, for example, when the outer tube member is attached to a target component for attachment such as a vehicle body by insertion or press-fitting, it is also possible to move the division units to suitable relative positions in the direction orthogonal to the direction of engagement of the first engaging part and the second engaging part and the like. This makes it possible to attach the outer tube member to the target component without being influenced by an assembly error of the division units or the like.

A second mode of the present invention provides the tubular vibration-damping device according to the first mode, wherein the outer tube member comprises the pair of division units mounted onto the vibration-damping device main unit from the opposite sides in an axis-perpendicular direction, and the division units that are butted at each other in a circumferential direction include the first engaging part and the second engaging part provided to circumferential ends thereof, the first engaging part and the second engaging part being engaged with each other by approach of the division units.

According to the second mode, the outer tube member has a structure which is divided in the axis-perpendicular direction. This makes it easy to form the outer tube member in a mounted state onto the outer peripheral surface of the vibration-damping device main unit, thereby improving operation efficiency during production and the like. Besides, even with the outer tube member having a divided structure in the axis-perpendicular direction for which the relative positions of the division units are likely to deviate in comparison with the outer tube member having a divided structure in the axial direction, the division units are allowed to undergo relative displacement in the connected state. This makes it possible to mount the outer tube member onto the vehicle body or the like without problems.

A third mode of the present invention provides the tubular vibration-damping device according to the second mode, wherein the first engaging part and the second engaging part are provided to at least one axial end of the outer tube member, and the pair of division units that constitute the outer tube member are allowed to undergo relative displacement in the axis-perpendicular direction orthogonal to the direction of engagement of the first engaging part and the second engaging part.

According to the third mode, the first engaging part and the second engaging part are provided to the axial end that is away from the portion to be inserted or press-fit with respect to the target component for attachment such as the vehicle body. Thus, even though concaves/convexes are formed on the surface of the outer tube member due to the engaging structure of the first engaging part and the second engaging part, it is possible to avoid influence of the concaves/convexes on the mounting of the outer tube member onto the target component.

Moreover, formation of the first engaging part and the second engaging part on the axial end of the outer tube member makes it easy to allow relative movement of the division units in the axis-perpendicular direction. Thus, when the outer tube member is attached to the target component such as the vehicle body by insertion or press-fitting, the division units can move to the suitable relative positions in the direction orthogonal to the direction of engagement of the first engaging part and the second engaging part, thereby facilitating the attachment of the outer tube member to the target component.

A fourth mode of the present invention provides the tubular vibration-damping device according to the third mode, wherein the first engaging part and the second engaging part are provided to each axial end of the outer tube member.

According to the fourth mode, by connecting the division units at each axial end, it is possible to more firmly and stably connect them. Besides, formation of at least one pair of the first engaging part and the second engaging part to each axial end of the outer tube member makes it possible to provide the first engaging part and the second engaging part at a position of the outer tube member that is away from the portion to be inserted or press-fit with respect to the target component for attachment such as the vehicle body.

A fifth mode of the present invention provides the tubular vibration-damping device according to any one of the second through fourth modes, wherein the first engaging part is provided to each circumferential end of one of the division units, and the second engaging part is provided to each circumferential end of another of the division units.

According to the fifth mode, frictional forces and the like that act during engagement of the first engaging part and the second engaging part will act with the magnitudes and in the directions corresponding to each other on both circumferential ends of the division units, so as to offset the moments acting on the division units. Thus, operation of connecting the division units and providing the outer tube member will become easy.

A sixth mode of the present invention provides the tubular vibration-damping device according to any one of the first through fifth modes, wherein the first engaging part and the second engaging part are provided to a circumferential wall part of the outer tube member, and the pair of division units that constitute the outer tube member are allowed to undergo relative displacement in an axial direction orthogonal to the direction of engagement of the first engaging part and the second engaging part.

According to the sixth mode, the division units are connected by engagement of the first engaging part and the second engaging part in a condition such that relative displacement in the axial direction is allowed. This makes it possible to prevent the division units from being fixed in a state of deviation with respect to each other in the axial direction, thereby realizing a suitable connected state.

A seventh mode of the present invention provides the tubular vibration-damping device according to any one of the first through sixth modes, wherein the main rubber elastic body of the vibration-damping device main unit is compressed between the pair of division units, and an urging force based on elasticity of the main rubber elastic body is exerted on the division units in a direction of separation of the division units from each other.

According to the seventh mode, with respect to the division units connected by engagement of the first engaging part and the second engaging part, the urging force, which acts in the direction such that the division units are separated from each other in the direction of engagement of the first engaging part and the second engaging part, is exerted based on elasticity of the main rubber elastic body. With this configuration, the first engaging part and the second engaging part are more firmly engaged, thereby realizing the connected state of the division units with stability. Besides, only by mounting the outer tube member onto the vibration-damping device main unit, it is possible to pre-compress the main rubber elastic body and to reduce tensile stress acting on the main rubber elastic body, thereby improving durability of the main rubber elastic body.

An eighth mode of the present invention provides the tubular vibration-damping device according to any one of the first through seventh modes, wherein the second engaging part has a frame shape, and the first engaging part is engaged with the second engaging part by being inserted into an inside of the second engaging part having the frame shape.

According to the eighth mode, the first engaging part and the second engaging part with simple configurations realize connection of the division units by engagement of the first engaging part and the second engaging part.

A ninth mode of the present invention provides the tubular vibration-damping device according to any one of the first through eighth modes, wherein the outer tube member is made of synthetic resin.

According to the ninth mode, with the division units constituting the outer tube member, the first engaging part and the second engaging part can be made with accuracy.

According to the present invention, by the pair of division units approaching each other and the first engaging part and the second engaging part, which are formed on the ends of the division units, being engaged, it is possible to readily provide the tubular outer tube member mounted onto the outer peripheral surface of the vibration-damping device main unit in a non-adhesive way. Additionally, the division units can be connected with sufficient strength in the direction of engagement of the first engaging part and the second engaging part. Moreover, with the division units connected, in the direction orthogonal to the direction of engagement of the first engaging part and the second engaging part, the division units are allowed to undergo relative displacement. This makes it possible to prevent the division units from being fixed in a state of deviation with respect to each other in the axial direction or in the axis-perpendicular direction, thereby attaching the outer tube member to the target component for attachment without being influenced by an error during assembly of the division units or the like.

BRIEF DESCRIPTION OF THE DRAWINGS

The foregoing and/or other objects, features and advantages of the invention will become more apparent from the following description of embodiments with reference to the accompanying drawings in which like reference numerals designate like elements and wherein.

DETAILED DESCRIPTION OF EMBODIMENTS

Embodiments of the present invention will be described below in reference to the drawings.

Figure 3:
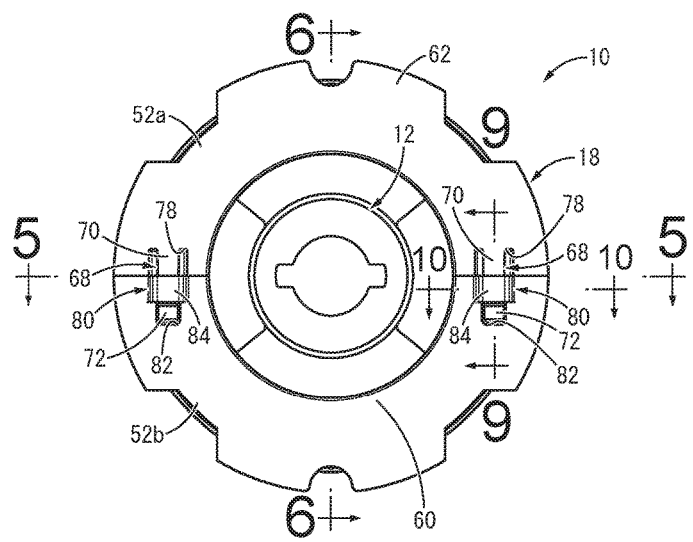
FIG. 3 is a front view of the differential mount shown in FIG. 1.
Figure 4:
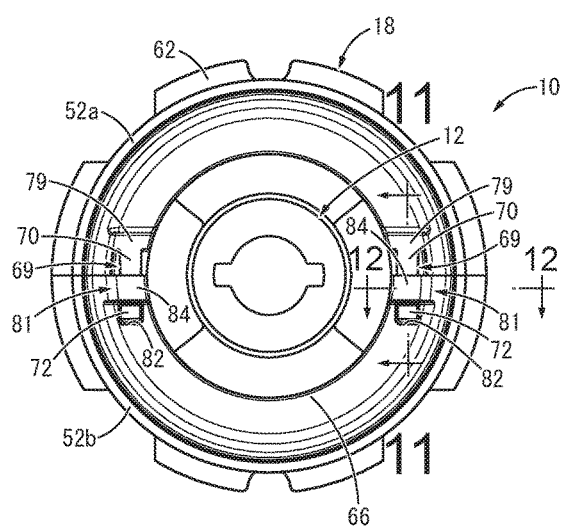
FIG. 4 is a rear view of the differential mount shown in FIG. 1.
Figure 5:
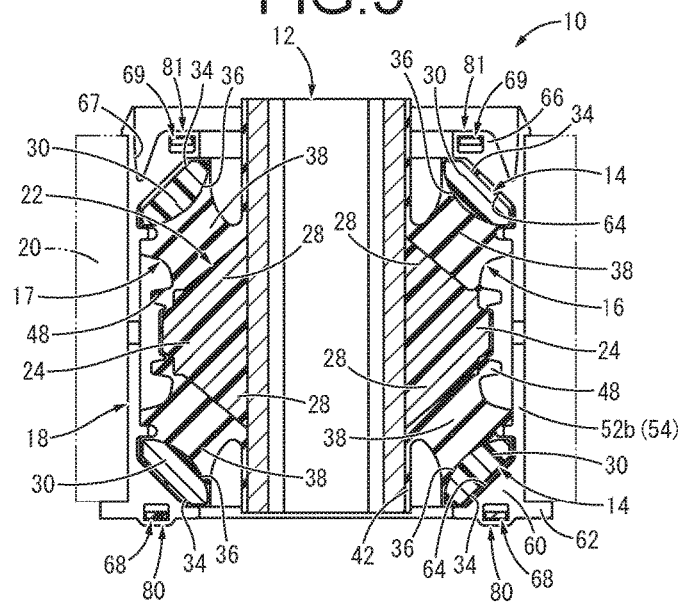
FIG. 5 is a cross sectional view taken along line 5-5 of FIG. 3.
Figure 6:
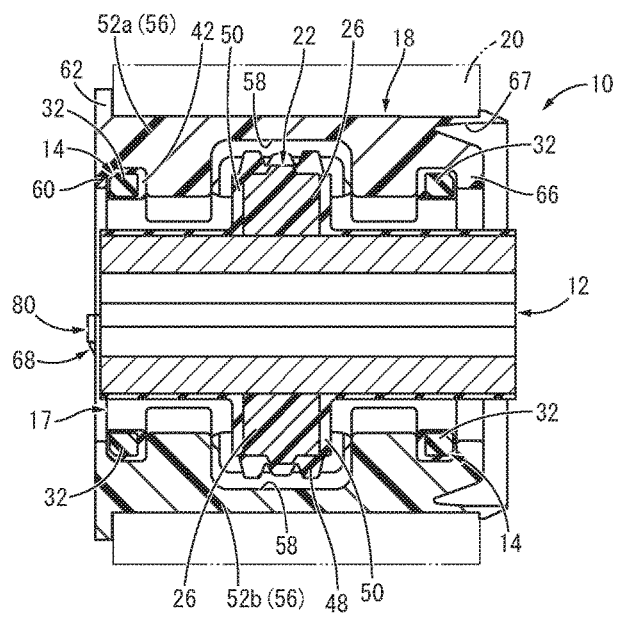
FIG. 6 is a cross sectional view taken along line 6-6 of FIG. 3.

FIGS. 1 through 6 depict an automotive differential mount 10 as a first embodiment of a tubular vibration-damping device constructed according to the present invention. As shown in FIGS. 5 and 6, the differential mount 10 includes a mount main unit 17 serving as a vibration-damping device main unit in which an inner shaft member 12 and an intermediate ring 14 are elastically connected by a main rubber elastic body 16. The differential mount 10 further includes an outer tube member 18 fitted externally onto the intermediate ring 14, so that the inner shaft member 12 and the outer tube member 18 are elastically connected by the main rubber elastic body 16. Then, by the inner shaft member 12 being attached to a differential gear (not shown) while the outer tube member 18 being attached to a mounting tube 20 of a sub frame serving as a target component for attachment, the differential gear (not shown) is configured to be supported in a vibration-damping manner on the sub frame (not shown).

Described more specifically, the inner shaft member 12 is a high rigidity component made of iron, aluminum alloy, fiber-reinforced synthetic resin or the like, and as shown in FIGS. 3 through 6, has a small-diameter, generally round tubular shape extending straightly. In the present embodiment, the borehole of the inner shaft member 12 is partially expanded in the circumferential direction. However, the specific shape of the borehole of the inner shaft member 12 is not limited in particular, and for example, a circular cross section, an elliptical cross section, or the like can be adopted.

Moreover, as shown in FIGS. 5 and 6, to the axially center portion of the inner shaft member 12, a stopper member 22 is attached. The stopper member 22 is an annular member made of rigid synthetic resin or the like. With the inner shaft member 12 inserted and fixed to the center hole of the stopper member 22, the stopper member 22 projects in the axis-perpendicular direction from the axially center portion of the inner shaft member 12. Besides, the stopper member 22 integrally comprises first stopper projections 24, 24 that project from the inner shaft member 12 to opposite sides in one axis-perpendicular direction, and second stopper projections 26, 26 that project to opposite sides in another axis-perpendicular direction which is roughly orthogonal to the direction of projection of the first stopper projections 24, 24. The first stopper projection 24 has a projecting dimension greater than that of the second stopper projection 26, and integrally includes an inner peripheral fixed portion 28 that projects to the axially opposite sides and gradually becomes greater in projecting dimension as it goes radially inward. Each of the first and second stopper projections 24, 26, is configured such that its projecting distal end has a stepped shape for which the axially center portion thereof projects greater than the axially opposite end portions thereof.

Meanwhile, as shown in FIGS. 5 and 6, the intermediate ring 14 is made of rigid synthetic resin or the like, and is an annular member that integrally includes a pair of bonding parts 30, 30 that are situated in opposition in one diametrical direction, and a pair of connecting parts 32, 32 that connect the circumferential ends of the bonding parts 30, 30.

As shown in FIG. 5, the bonding part 30 has a slope shape that gradually becomes smaller in diameter outward in the axial direction when viewed in vertical cross section, and continues with a generally constant cross-sectional shape for a prescribed length less than half the circumference. Besides, with the bonding part 30, the axially outer edge portion of the outer circumferential surface comprises a guiding slope face 34 that becomes smaller in diameter outward in the axial direction, while the inner circumferential surface comprises a sloping curve face 36 having a slope shape that becomes smaller in diameter outward in the axial direction as well as having a curved shape that is convex inward.

When viewed in vertical cross section shown in FIG. 6, the connecting part 32 has a cross-sectional shape such that one corner of a rectangle is diagonally cut off, and is integrally formed with the bonding part 30 so as to extend from the axially outer edge portion of the bonding part 30 to the circumferential outside. With this configuration, the pair of bonding parts 30, 30 are connected by the pair of connecting parts 32, 32 in the circumferential direction, so as to integrally form the intermediate ring 14 that continues about the entire circumference.

Then, a pair of the intermediate rings 14, 14, which are arranged so as to be symmetrical with respect to a plane that extends in the axis-perpendicular direction, are placed externally about the inner shaft member 12, and are arranged separately on the axially opposite sides with the stopper member 22 being interposed therebetween so as to be spaced apart from the inner shaft member 12 and the stopper member 22 with prescribed distances. The inner shaft member 12 with the stopper member 22 and the pair of intermediate rings 14, 14 that are arranged in this way are elastically connected by the main rubber elastic body 16.

As shown in FIG. 5, the main rubber elastic body 16 includes four rubber arms 38, 38, 38, 38 having a cross-sectional shape that gradually slopes to the outer peripheral side outward in the axial direction and extending for a prescribed length in the circumferential direction. Each rubber arm 38 is formed between opposed faces of the inner peripheral fixed portion 28 of the first stopper projection 24 of the stopper member 22 and the sloping curve face 36 of the bonding part 30 of the intermediate ring 14, and is bonded by vulcanization to the first stopper projection 24 of the stopper member 22 and the bonding part 30 of the intermediate ring 14. That is, the main rubber elastic body 16 takes the form of an integrally vulcanization molded component incorporating the inner shaft member 12 and the stopper member 22, as well as the pair of intermediate rings 14, 14. In the present embodiment, the outer circumferential surface of the inner shaft member 12 and the entire surface of the intermediate ring 14 are covered by a rubber sheath layer 42 that is integrally formed with the main rubber elastic body 16. Also, the rubber arm 38 of the main rubber elastic body 16 extends roughly in the direction of opposition of the axial outer face of the inner peripheral fixed portion 28 and the sloping curve face 36.

Furthermore, as shown in FIGS. 5 and 6, an outer peripheral rubber stopper 48 is bonded to the projecting distal end faces of the first and second stopper projections 24, 26, while an axial-direction rubber stopper 50 is bonded to the axially opposite faces of the second stopper projection 26, and both of the outer peripheral rubber stopper 48 and the axial-direction rubber stopper 50 are integrally formed with the main rubber elastic body 16. With the outer peripheral rubber stopper 48, the portions bonded to the axially opposite ends of the projecting distal end of the first stopper projection 24 are made thicker than the portion bonded to the axial center thereof, so that the axially opposite end portions of the outer peripheral rubber stopper 48 reach further to the outer peripheral side than the axial center portion thereof. Moreover, with the outer peripheral rubber stopper 48, between the axially opposite end portions and the axially center portion thereof, there are formed grooves opening onto the outer circumferential surface with a roughly V-shaped cross section. This sufficiently permits the outer peripheral rubber stopper 48 to undergo swelling deformation in the axial direction due to its compressive deformation in the radial direction.

Figure 7:
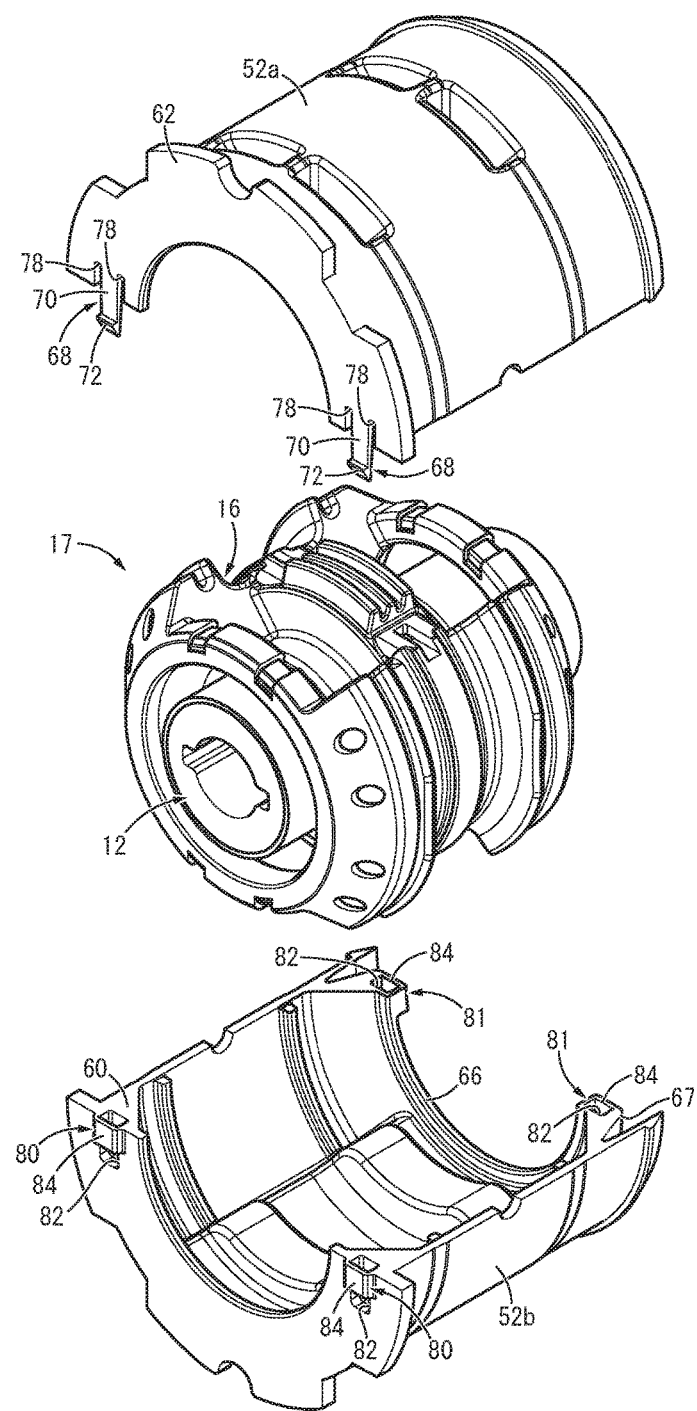
FIG. 7 is an exploded perspective view in which the differential mount shown in FIG. 1 is split into a vibration-damping device main unit and a pair of division units.
Figure 8:
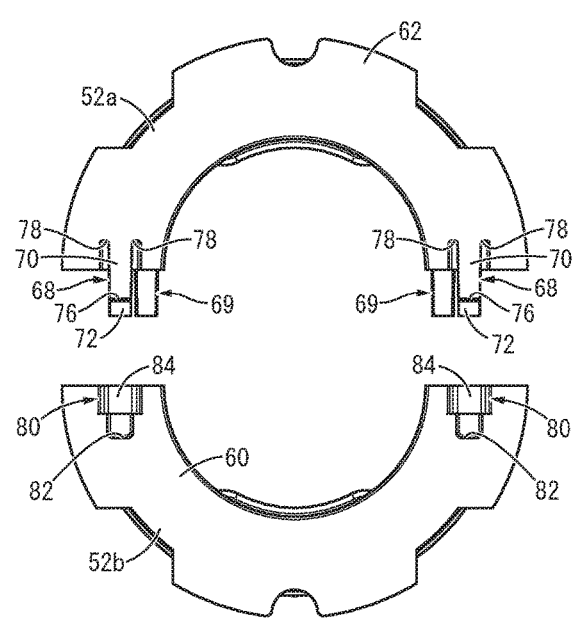
FIG. 8 is a front view of the division units constituting the differential mount shown in FIG. 1 in a separated state.
Figure 9:
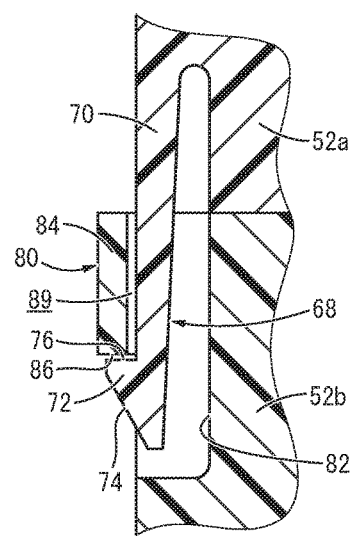
FIG. 9 is an enlarged cross sectional view of a principal part of the division units suitable for explaining a connecting structure thereof, taken along line 9-9 of FIG. 3.
Figure 10:
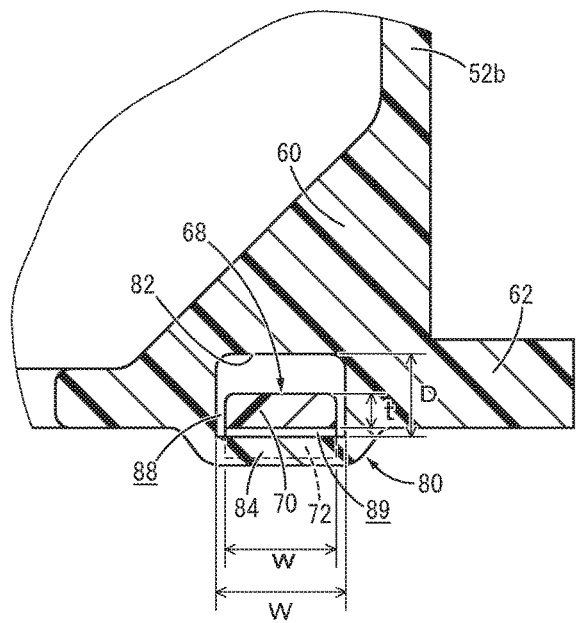
FIG. 10 is an enlarged cross sectional view of a principal part of the division units suitable for explaining the connecting structure thereof, taken along line 10-10 of FIG. 3.

The outer tube member 18 is mounted onto the intermediate rings 14, 14 of the mount main unit 17 having the above construction. As shown in FIGS. 1 through 6, the outer tube member 18 is a high rigidity component made of rigid synthetic resin or the like, and has a generally round tubular shape overall. Besides, the outer tube member 18 has a configuration of two divided sections combining a pair of division units 52a, 52b each having a roughly semicircular tube shape (see FIGS. 7 and 8). In the present embodiment, the division units 52a, 52b are generally identical with each other in shape. One division unit 52a includes a first engaging part 68 described later, while the other division unit 52b includes a second engaging part 80 described later, and the outer tube member 18 is constituted by combining these division units 52a, 52b to face each other. The outer tube member 18 can also be made of a metallic material.

Described more specifically, the division unit 52a/52b has an outer circumferential surface with a generally constant curvature radius. As shown in FIG. 5, the both end portions in the circumferential direction constitute a thin portion 54 with a larger inside diameter dimension, while as shown in FIG. 6, the center portion in the circumferential direction constitutes a thick portion 56 with a smaller inside diameter dimension. In the axially center portion of the thick portion 56, a groove-shaped portion 58 is formed to open radially inward, so that the inside diameter dimension of the thick portion 56 is partially made larger.

Additionally, at one axial end of the division unit 52a/52b, a first inner flange portion 60 projecting radially inward and an outer flange portion 62 projecting radially outward are integrally formed. As shown in FIG. 5, with the first inner flange portion 60, at the both end portions in the circumferential direction of the division unit 52a/52b that are made thin, there is integrally provided a proximal end part that gradually becomes thinner in the axial direction toward the projecting distal end, and a distal end part that projects radially inward from the proximal end part with a generally constant axial thickness. Meanwhile, at the center portion in the circumferential direction of the division unit 52a/52b that are made thick, as shown in FIG. 6, the first inner flange portion 60 is provided with only the distal end part that projects with a generally constant axial thickness. With the first inner flange portion 60, the axial inner face of the proximal end part constitutes a holding slope face 64 that slopes to the axial outside as it goes to the radial inside. Whereas the outer flange portion 62 is provided intermittently in the circumferential direction in the present embodiment, the outer flange portion 62 may, for example, be provided continuously about the entire circumference, or may alternatively be dispensed with.

On the other hand, at the other axial end of the division unit 52a/52b, a second inner flange portion 66 projecting radially inward is integrally formed. As shown in FIG. 5, similarly to the first inner flange portion 60, with the second inner flange portion 66, at the both end portions in the circumferential direction of the division unit 52a/52b that are made thin, there is integrally provided a proximal end part that gradually becomes narrower in the axial direction toward the projecting distal end, and a distal end part that projects radially inward from the proximal end part with a generally constant axial width. Moreover, the proximal end part of the second inner flange portion 66 includes a deformation allowing groove 67 that opens onto the axial end face thereof and extends continuously about the entire circumference. Similarly to the first inner flange portion 60, with the second inner flange portion 66, the axial inner face of the proximal end part constitutes a holding slope face 64 that slopes to the axial outside as it goes to the radial inside. Meanwhile, at the center portion in the circumferential direction of the division unit 52a/52b that are made thick, as shown in FIG. 6, the second inner flange portion 66 is provided with only the distal end part that projects with a generally constant axial thickness.

Besides, as shown in FIGS. 3 and 4, one division unit 52a includes the first engaging part 68 formed on the first inner flange portion 60, and a first engaging part 69 with a different structure formed on the second inner flange portion 66. With the division unit 52a of the present embodiment, the first engaging parts 68, 69 are respectively provided to the first and second inner flange portions 60, 66 that are provided to the axially opposite ends of the division unit 52a. The first engaging part 68 is provided to each circumferential end of the first inner flange portion 60, while the first engaging part 69 is provided to each circumferential end of the second inner flange portion 66. Also, in the present embodiment, the first engaging part 68, 69 provided to one circumferential end of the division unit 52a and the first engaging part 68, 69 provided to the other circumferential end of the division unit 52a are roughly identical in shape and size with each other, but may be different in shape and size from each other.

As shown in FIGS. 7 through 10, the first engaging part 68 includes an elongated, plate-shaped elastic support part 70 that projects from the circumferential end of the division unit 52a to the circumferential outside, and at the distal end portion of the elastic support part 70, there is formed an engaging projection 72 that projects to the outside in the thickness direction of the elastic support part 70 (namely, the axial direction of the division unit 52a). The engaging projection 72 has a projecting height that becomes smaller toward the distal end side of the elastic support part 70, and the end face of the engaging projection 72 that is positioned on the distal end side of the elastic support part 70 constitutes a guide surface 74, while the end face of the engaging projection 72 that is positioned on the proximal end side of the elastic support part 70 constitutes a first engaging surface 76. The guide surface 74 extends so as to slope with respect to the direction of projection of the elastic support part 70, while the first engaging surface 76 extends so as to be roughly orthogonal to the direction of projection of the elastic support part 70, which is the direction of engagement with a second engaging surface 86 described later. Additionally, on the first inner flange portion 60 provided to the division unit 52a, there are formed slits 78 that open onto the circumferential end face at the diametrically both sides of the elastic support part 70. This configuration can obtain a large amount of displacement of the engaging projection 72 allowed by elastic deformation of the elastic support part 70 without the need for a large projecting dimension of the elastic support part 70 from the division unit 52a.

Figure 1:
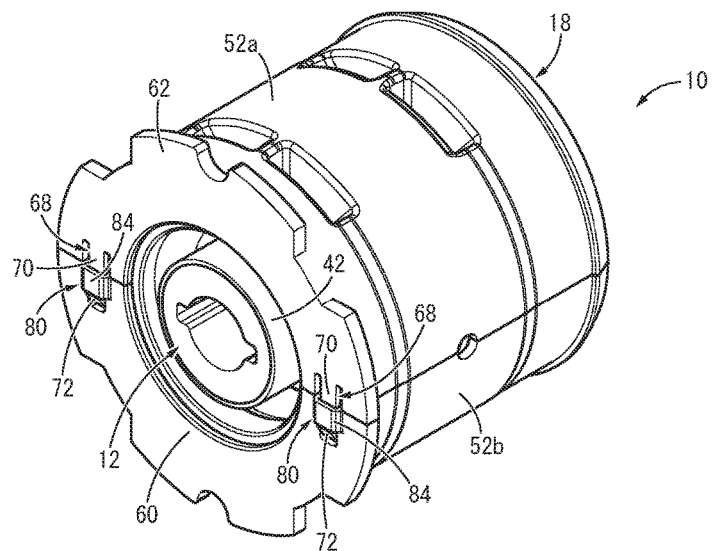
FIG. 1 is a perspective view showing a differential mount as a first embodiment of the present invention.
Figure 2:
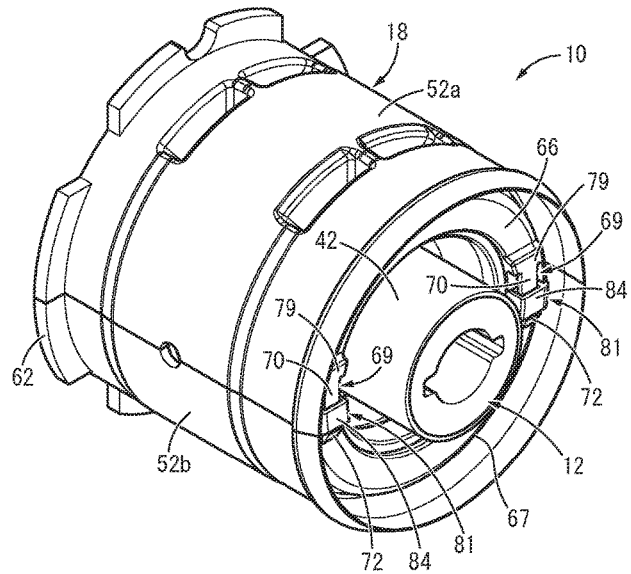
FIG. 2 is a perspective view of the differential mount shown in FIG. 1 from a different angle.
Figure 11:
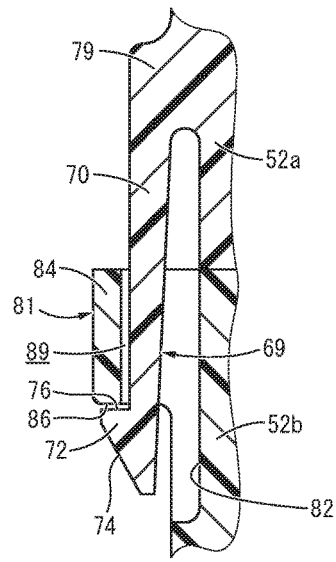
FIG. 11 is an enlarged cross sectional view of a principal part of the division units suitable for explaining the connecting structure thereof, taken along line 11-11 of FIG. 4.
Figure 12:
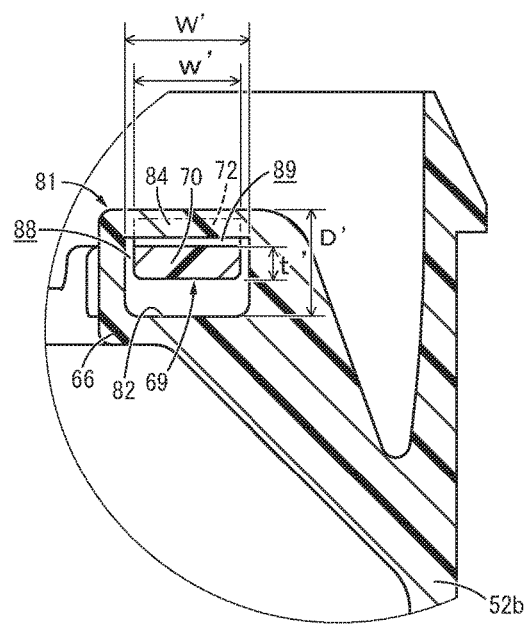
FIG. 12 is an enlarged cross sectional view of a principal part of the division units suitable for explaining the connecting structure thereof, taken along line 12-12 of FIG. 4.

Meanwhile, as shown in FIGS. 2, 11, and 12, the first engaging part 69 includes a base portion 79 that projects axially outward in the vicinity of the circumferential end of the division unit 52a. The elongated, plate-shaped elastic support part 70 is formed so as to project from the base portion 79 to the circumferential outside, and at the distal end portion of the elastic support part 70, there is formed the engaging projection 72 that projects to the outside in the thickness direction of the elastic support part 70 (namely, the axial direction of the division unit 52a). The elastic support part 70 and the engaging projection 72 are substantially identical in structure with those of the first engaging part 68, and will not be described herein.

On the other hand, the other division unit 52b includes the second engaging part 80 formed on the first inner flange portion 60, and a second engaging part 81 formed on the second inner flange portion 66. With the division unit 52b of the present embodiment, the second engaging parts 80, 81 are respectively provided to the first and second inner flange portions 60, 66 that are provided to the axially opposite ends of the division unit 52b. The second engaging part 80 is provided to each circumferential end of the first inner flange portion 60, while the second engaging part 81 is provided to each circumferential end of the second inner flange portion 66. Also, in the present embodiment, the second engaging parts 80, 81 provided to one circumferential end of the division unit 52b and the second engaging parts 80, 81 provided to the other circumferential end of the division unit 52b are roughly identical in shape and size with each other, but may be different in shape and size from each other.

The second engaging part 80 includes an insertion groove 82 that opens onto the circumferential end face and the axial end face of the first inner flange portion 60 while extending in the direction roughly orthogonal to the circumferential end face of the division unit 52b. The second engaging part 80 further includes an engaging receiver 84 provided to the circumferential end of the division unit 52b while extending so as to straddle the axial opening of the insertion groove 82, so as to have a generally rectangular frame shape overall that opens in the circumferential direction of the division unit 52b. The second engaging part 81 provided to the second inner flange portion 66 is substantially identical in structure with the second engaging part 80 provided to the first inner flange portion 60, and will be assigned like symbols without being described in any detail.

By the division unit 52a and the division unit 52b approaching each other in the axis-perpendicular direction, with the circumferential end faces of the division units 52a, 52b butted at each other, the division units 52a, 52b are connected by the first, second engaging parts 68, 80 and the first, second engaging parts 69, 81.

Figure 13:
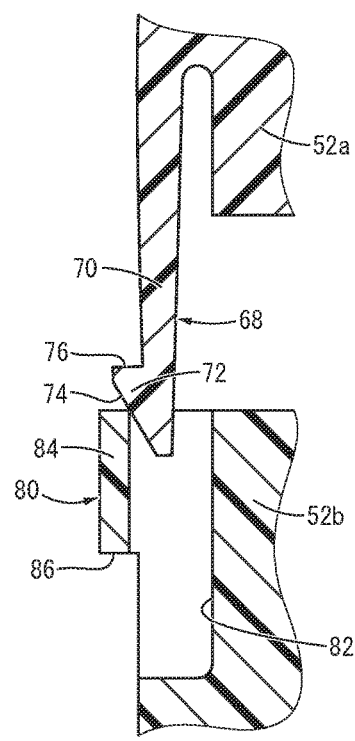
FIG. 13 is an enlarged cross sectional view of a principal part of the division units suitable for explaining a connecting process thereof.

Specifically, when the division unit 52a and the division unit 52b approach each other in the axis-perpendicular direction, each engaging receiver 84 of the second engaging parts 80, 81 comes into contact with the guide surface 74 of the corresponding engaging projection 72 (see FIG. 13). Further, by the division unit 52a and the division unit 52b approaching each other while the engaging receiver 84 being in sliding contact with the guide surface 74 of the engaging projection 72, the first engaging parts 68, 69 are inserted into the inside of the second engaging parts 80, 81 having the frame shape. Then, when the engaging projection 72 is inserted further to the circumferential inside of the division unit 52b than the engaging receiver 84, the contact between the engaging projection 72 and the engaging receiver 84 becomes released, so that the engaging projections 72 of the first engaging parts 68, 69 are displaced radially outward due to elastic recovery force of the elastic support parts 70.

By so doing, the engaging projection 72 moves to roughly the same radial position as the engaging receiver 84, and the first engaging surface 76 of the engaging projection 72 is overlapped with the second engaging surface 86 of the engaging receiver 84. Accordingly, the first engaging parts 68, 69 and the second engaging parts 80, 81 are engaged with each other in the direction in which the first engaging surface 76 and the second engaging surface 86 are overlapped. As a result, the division unit 52a and the division unit 52b are connected and positioned with respect to each other by engagement of the first engaging parts 68, 69 and the second engaging parts 80, 81, whereby the connected division units 52a, 52b constitute the tubular outer tube member 18.

Also, the groove width dimension W of the insertion groove 82 of the second engaging part 80 is made larger than the width dimension w of the elastic support part 70 and the engaging projection 72 of the first engaging part 68. Besides, the distance D between the opposed faces of the base wall face of the insertion groove 82 and the engaging receiver 84 of the second engaging part 80 is made larger than the thickness t of the elastic support part 70 of the first engaging part 68. With these configurations, with the elastic support part 70 and the engaging projection 72 inserted in the insertion groove 82, there is formed a gap 88 between the elastic support part 70 that constitutes the first engaging part 68 and the groove-side inner surface of the insertion groove 82 that constitutes the second engaging part 80, while there is formed a gap 89 between the elastic support part 70 that constitutes the first engaging part 68 and the inner peripheral surface of the engaging receiver 84 of the second engaging part 80 (see FIGS. 9 and 10).

Moreover, the groove width dimension W' of the engaging receiver 84 of the second engaging part 81 is made larger than the width dimension w' of the elastic support part 70 and the engaging projection 72 of the first engaging part 69. Besides, the groove depth dimension D' of the engaging receiver 84 of the second engaging part 81 is made larger than the thickness t' of the elastic support part 70 of the first engaging part 69. With these configurations, with the first engaging part 69 inserted in the second engaging part 81, there is formed a gap 88 between the elastic support part 70 that constitutes the first engaging part 69 and the groove-side inner surface of the insertion groove 82 that constitutes the second engaging part 81, while there is formed a gap 89 between the elastic support part 70 that constitutes the first engaging part 69 and the inner peripheral surface of the engaging receiver 84 of the second engaging part 81 (see FIGS. 11 and 12).

Owing to these gaps 88, 89, the division units 52a, 52b connected by the first engaging parts 68, 69 and the second engaging parts 80, 81 are allowed to undergo relative displacement in the axial direction and in the diametrical direction orthogonal to the direction of mutual butting that is the direction of engagement of the first engaging parts 68, 69 and the second engaging parts 80, 81 (vertical direction in FIG. 3).

Additionally, the division unit 52a and the division unit 52b are fitted onto the outer peripheral surface of the mount main unit 17 from the opposite sides in the diametrical direction. By the division units 52a, 52b being connected so as to constitute the outer tube member 18, the outer tube member 18 is externally mounted onto the mount main unit 17.

Furthermore, the main rubber elastic body 16 of the mount main unit 17 disposed diametrically between the division units 52a, 52b is compressed in the direction of butting of the division units 52a, 52b by the division units 52a, 52b being connected by the first engaging parts 68, 69 and the second engaging parts 80, 81. By so doing, tensile stress of the main rubber elastic body 16 is reduced, thereby improving its durability. Besides, an urging force based on elasticity of the main rubber elastic body 16 is exerted on the division units 52a, 52b in the direction of separation from each other (outward in the vertical direction in FIG. 3). Accordingly, the first engaging surface 76 of each engaging projection 72 of the first engaging parts 68, 69 is retained in a state of contact with the second engaging surface 86 of each engaging receiver 84 of the second engaging parts 80, 81.

When the division units 52a, 52b are mounted onto the mount main unit 17, the guiding slope face 34 of the intermediate ring 14 is overlapped with the holding slope face 64 of the first inner flange portion 60 or the second inner flange portion 66 that slopes in the same direction, so that the intermediate rings 14, 14 on the axially opposite sides are configured to be guided to the axial inside due to the approaching displacement of the division units 52a, 52b. By so doing, with the outer tube member 18 mounted onto the mount main unit 17, the intermediate rings 14, 14 approach each other in the axial direction, whereby the rubber arms 38 of the main rubber elastic body 16 are pre-compressed between the intermediate rings 14, 14 and the inner peripheral fixed portion 28. Also, the relative positions of the pair of intermediate rings 14, 14 in the axial direction, in other words, the axial length of the main rubber elastic body 16, is regulated by contact of the first, second inner flange portions 60, 66 of the division units 52a, 52b and the intermediate rings 14, 14. That is, the first, second inner flange portions 60, 66 function as outer regulating protrusions that regulate the relative positions of the intermediate rings 14, 14 in the axial direction and retain the main rubber elastic body 16 in a pre-compressed state.

With the differential mount 10 constructed in the above manner, the inner shaft member 12 is configured to be attached to a differential gear (not shown), while as shown in FIG. 5, the outer tube member 18 is configured to be inserted and fixed into the mounting tube 20 provided to a sub frame or the like. Here, with the outer tube member 18 constituted by the pair of division units 52a, 52b, relative displacement of the division units 52a, 52b is allowed by the gaps 88, 89. Therefore, during insertion into the mounting tube 20, the division units 52a, 52b move to suitable relative positions, so that the outer tube member 18 is shaped to be insertable into the mounting tube 20. This will prevent attachment failure of the outer tube member 18 to the mounting tube 20 caused by errors or the like during assembly of the division units 52a, 52b, making it possible to reliably attach the differential mount 10 to the vehicle. The attachment position of the outer tube member 18 to the mounting tube 20 in the axial direction is configured to be regulated by the axial end face of the mounting tube 20 coming into contact with the outer flange portion 62.

Furthermore, in the present embodiment, the first engaging parts 68, 69 and the second engaging parts 80, 81 are formed on the first, second inner flange portions 60, 66. Thus, relative displacement of the division units 52a, 52b owing to the gaps 88, 89 is allowed in the axis-perpendicular direction, thereby reliably inserting the outer tube member 18 into the mounting tube 20.

Besides, the division units 52*a*, 52*b* are connected to each other with sufficient strength by engagement of the engaging projections 72, 72 of the first engaging parts 68, 69 and the engaging receivers 84, 84 of the second engaging parts 80, 81. Accordingly, connection between the division units 52*a*, 52*b* is less likely to be released due to external force acting thereon during storage, transportation, or the like, so that the division units 52*a*, 52*b* are stably retained in the connected state to constitute the outer tube member 18.

Additionally, in the present embodiment, the engagement structure constituted by the first engaging part 68, 69 and the second engaging part 80, 81 is provided to each circumferential end as well as to each axial end of the division units 52*a*, 52*b*. Thus, the division units 52*a*, 52*b* are connected with excellent reliability by four engagement structures.

Moreover, the division unit 52*a* includes two each of the first engaging parts 68, 69, while the division unit 52*b* includes two each of the second engaging parts 80, 81. With this arrangement, when the division units 52*a*, 52*b* approach each other so that the first engaging parts 68, 69 and the second engaging parts 80, 81 are engaged, moments caused by frictional resistance or the like due to sliding contact between the engaging projections 72, 72 and the engaging receivers 84, 84 will be canceled by each other so as to be decreased or avoided. This facilitates connection operation of the division units 52*a*, 52*b*, thereby achieving excellent productivity through improvement in operation efficiency. In the present embodiment in particular, the first engaging part 68, 69 provided to one circumferential end of the division unit 52*a* and the first engaging part 68, 69 provided to the other circumferential end thereof are roughly identical with each other, while the second engaging part 80, 81 provided to one circumferential end of the division unit 52*b* and the second engaging part 80, 81 provided to the other circumferential end thereof are roughly identical with each other. Thus, offset of the moments during connection operation of the division units 52*a*, 52*b* may be more efficiently achieved.

In addition, the first engaging parts 68, 69 of the present embodiment have a structure in which the engaging projection 72 is provided to the distal end portion of the elastic support part 70. When the guide surface 74 of the engaging projection 72 comes into contact with the engaging receiver 84, contact reaction force acts on the elastic support part 70. Due to the contact reaction force, the elastic support part 70 undergoes elastic deformation so as to flex in the thickness direction, so that the engaging projection 72 is configured to override the engaging receiver 84 and be engaged therewith. By so doing, the engaging projection 72 and the engaging receiver 84 are engaged only by having the division units 52*a*, 52*b* approach each other while relatively positioning them, thereby further facilitating the connection operation of the division units 52*a*, 52*b*.

In the present embodiment, by the division units 52*a*, 52*b* being urged by elasticity of the main rubber elastic body 16, the first engaging surface 76 of the engaging projection 72 and the second engaging surface 86 of the engaging receiver 84 are retained in a state of contact. This will prevent occurrence of noises or damage to the elastic support part 70 caused by the engaging projection 72 and the engaging receiver 84 coming into contact from remote positions. Besides, the main rubber elastic body 16 is pre-compressed due to mounting of the division units 52*a*, 52*b*. This will realize improvement in durability or the like owing to decrease in tensile stress acting on the main rubber elastic body 16 during input of vibration.

Also, the first engaging parts 68, 69 and the second engaging parts 80, 81 are provided to the first, second inner flange portions 60, 66 formed on the axial ends of the outer tube member 18. Accordingly, the engagement and connecting structures of the division units 52*a*, 52*b* by means of the first engaging parts 68, 69 and the second engaging parts 80, 81 are arranged in the radially medial portions of the first, second inner flange portions 60, 66. This can prevent the first engaging parts 68, 69 and the second engaging parts 80, 81 from being provided to the outer circumferential surface of the outer tube member 18 to be inserted into the mounting tube 20. With this configuration, during insertion of the outer tube member 18 into the mounting tube 20, for example, it is possible to avoid troubles such as the engaging projection 72 touching the mounting tube 20 and causing release of engagement of the first engaging parts 68, 69 and the second engaging parts 80, 81, the engagement structure being caught by the mounting tube 20, and the like.

The outer tube member 18 may be made of metal. However, the outer tube member 18 made of synthetic resin is able to achieve reduced weight and reduced cost, while providing the first engaging parts 68, 69 and the second engaging parts 80, 81 with accuracy.

Figure 14:
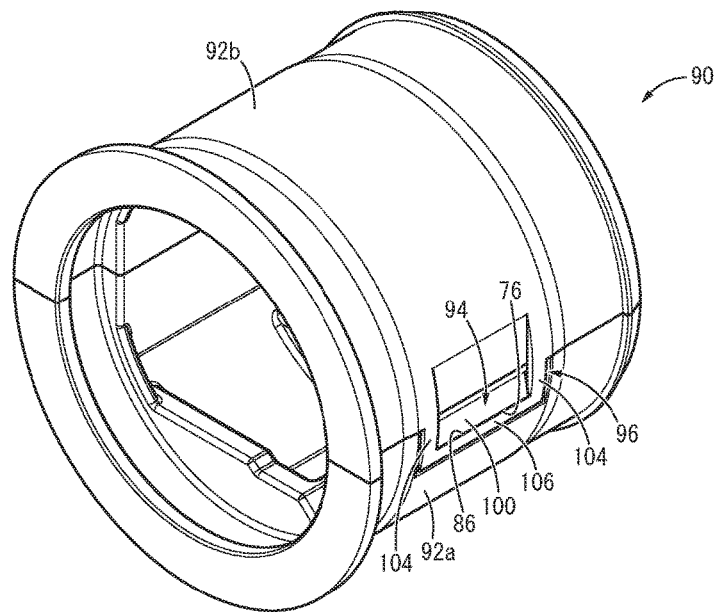
FIG. 14 is a perspective view showing an outer tube member constituting a differential mount as a second embodiment of the present invention.
Figure 15:
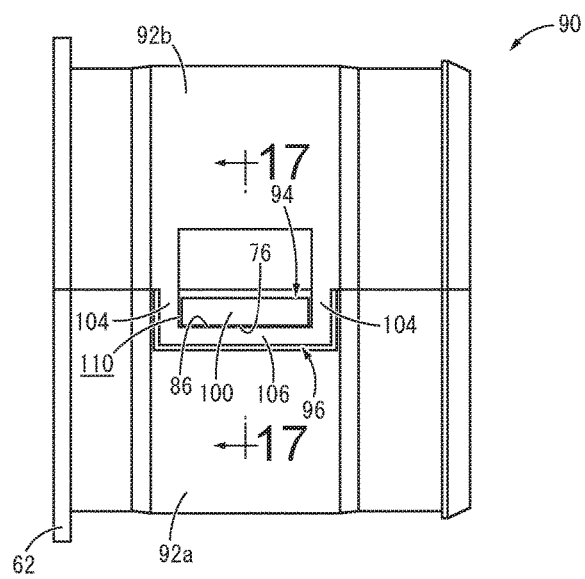
FIG. 15 is a right side view of the outer tube member shown in FIG. 14.

FIGS. 14 and 15 depict an outer tube member 90 that constitutes a differential mount according to a second embodiment of the present invention. The outer tube member 90 has a structure in which division units 92*a*, 92*b* are combined. The division units 92*a*, 92*b* are connected to each other by engagement of a first engaging part 94 provided to the circumferential wall outer surface of the division unit 92*a* and a second engaging part 96 provided to the circumferential wall outer surface of the division unit 92*b*, thereby forming the outer tube member 90. In the description hereinbelow, components and parts that are substantially identical with those in the first embodiment will be assigned like symbols and not described in any detail. Also, the vibration-damping device main unit can adopt substantially the same structure as the mount main unit 17 of the first embodiment, and is neither depicted in the drawings nor discussed in detail here.

Described more specifically, on the outer circumferential surface of the division unit 92*a*, there is formed a flat surface 98 that extends in the direction of butting of the division units 92*a*, 92*b* on the axially center portion of each circumferential end. Each flat surface 98 includes an engaging projection 100 projecting radially outward, which constitutes the first engaging part 94. With the engaging projection 100, the projecting height becomes smaller toward the circumferentially outside of the division unit 92*a*, so that its projecting distal end face constitutes a guide surface 102 sloping with respect to the flat surface 98. Additionally, the end face of the engaging projection 100 positioned on the circumferentially inside of the division unit 92*a* comprises a first engaging surface 76 that extends roughly orthogonally to the circumferential direction of the division unit 92*a*.

Figure 16:
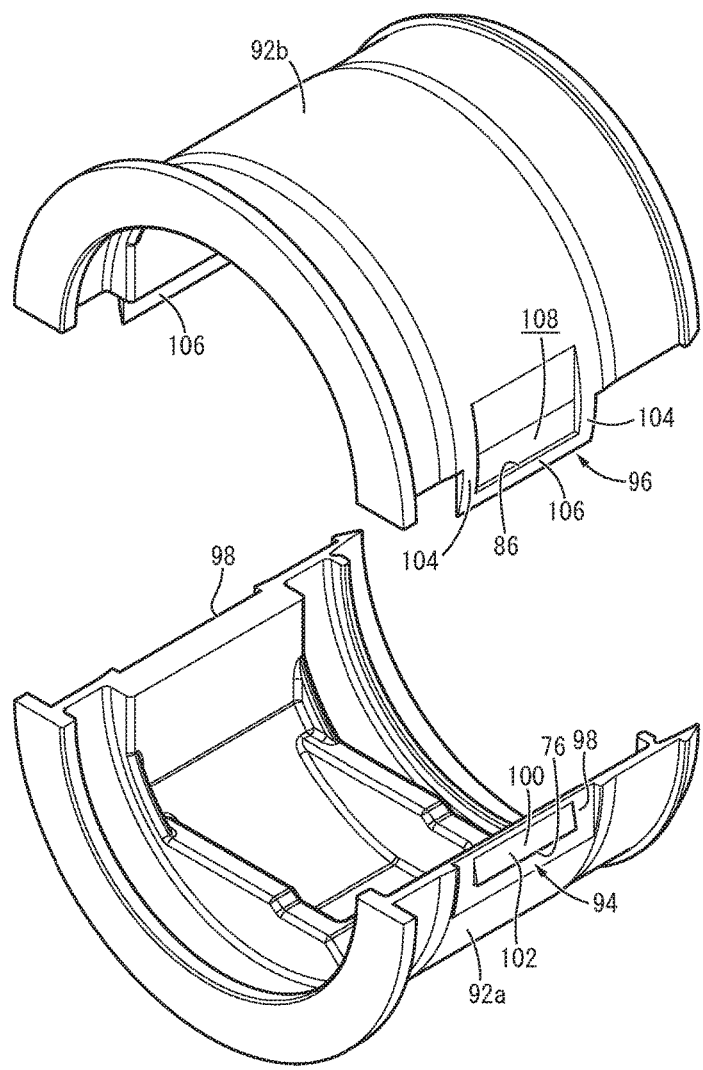
FIG. 16 is an exploded perspective view in which the outer tube member shown in FIG. 14 is split into a pair of division units.

Meanwhile, as shown in FIG. 16, the second engaging part 96 provided to the division unit 92*b* has a generally rectangular frame shape overall, and projects from the circumferential end of the division unit 92*b* to the outside in the circumferential direction. More specifically, the second engaging part 96 includes a pair of elastic support parts 104, 104 extending from the mutually remote positions in the axial direction to the outside in the circumferential direction, and an engaging receiver 106 extending straightly in the axial direction so as to connect the projecting distal ends of the elastic support parts 104, 104 to each other. The second engaging part 96 is radially perforated by a rectangular-hole shaped window 108 surrounded by the circumferential end of the division unit 92b, the elastic support parts 104, 104, and the engaging receiver 106. Moreover, the face of the engaging receiver 106 that constitutes the wall inner surface of the window 108 comprises a second engaging surface 86 corresponding to the first engaging surface 76. The outer circumferential surface of the second engaging part 96 comprises a curving surface that corresponds to the outer circumferential surface of the division unit 92b.

Figure 17:
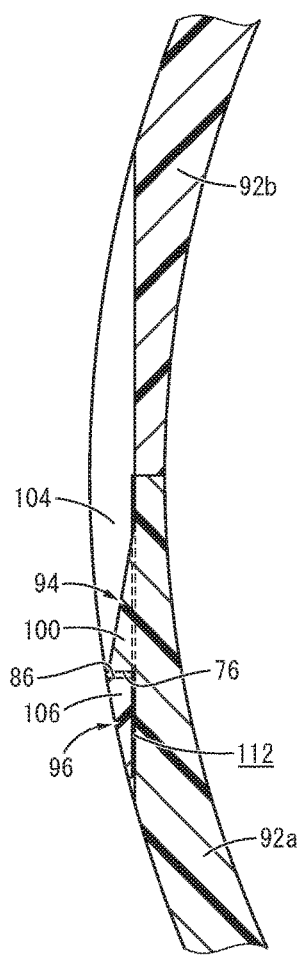
FIG. 17 is an enlarged cross sectional view of a principal part of the outer tube member shown in FIG. 14, taken along line 17-17 of FIG. 15.

When the division unit 92a and the division unit 92b approach each other in the vertical direction (the vertical direction in FIG. 15), the engaging receiver 106 of the second engaging part 96 of the division unit 92b overrides the first engaging part 94 of the division unit 92a due to elastic deformation of the elastic support parts 104, 104 of the second engaging part 96. Then, the engaging receiver 106 that has overridden the first engaging part 94 moves to roughly the same radial position as the first engaging part 94 due to the elasticity of the elastic support parts 104, 104. By so doing, as shown in FIG. 17, the first engaging surface 76 of the first engaging part 94 and the second engaging surface 86 of the second engaging part 96 are overlapped with each other so that the engaging projection 100 of the first engaging part 94 and the engaging receiver 106 of the second engaging part 96 are engaged in the direction of butting of the division unit 92a and the division unit 92b. The division unit 92a and the division unit 92b are connected to each other thereby.

Moreover, with the engaging projection 100 of the first engaging part 94, the width dimension in the axial direction (the lateral direction in FIG. 15) is made smaller than the width dimension of the window 108 of the second engaging part 96 in the axial direction. Accordingly, with the first engaging part 94 and the second engaging part 96 engaged, there is formed a gap 110 between the engaging projection 100 and the pair of elastic support parts 104, 104 (see FIG. 15). With this arrangement, the division unit 92a and the division unit 92b are allowed to undergo relative displacement in the axial direction by the gap 110 in a state of being connected to each other by engagement of the first engaging part 94 and the second engaging part 96.

Furthermore, with the division unit 92a and the division unit 92b arranged in suitable relative positions, the inside planes of the pair of elastic support parts 104, 104 and the engaging receiver 106 of the second engaging part 96 are spaced apart from the flat surface 98 of the first engaging part 94 with a gap 112 (see FIG. 17). With this configuration, the division unit 92a and the division unit 92b are, in a state of being connected to each other by engagement of the first engaging part 94 and the second engaging part 96, allowed to undergo relative displacement by the gap 112 in the radial direction orthogonal to the direction of engagement of the first engaging part 94 and the second engaging part 96 (the lateral direction in FIG. 17).

In the present embodiment, the outer surface of the second engaging part 96 comprises a curving surface that curves with approximately the same curvature as the outer circumferential surface of the outer tube member 90, while the engaging projection 100 of the first engaging part 94 has a height so as not to project further to the radially outside than the second engaging part 96. Thus, as shown in FIG. 17, with the first engaging part 94 and the second engaging part 96 engaged, there is no such projecting structure as to hinder the insertion of the outer tube member 90 into the mounting tube 20. In FIGS. 14, 15, and 17, the outer tube member 90 is depicted in a state in which the division units 92a, 92b are arranged in suitable relative positions by being inserted into the mounting tube 20. As depicted, the circumferential end faces of the division units 92a, 92b are in contact with each other, while the first engaging surface 76 of the first engaging part 94 and the second engaging surface 86 of the second engaging part 96 are remote from each other.

With the differential mount including the outer tube member 90 according to the present embodiment as well, similarly to the first embodiment, relative displacement of the connected division units 92a, 92b is allowed by the gaps 110, 112, whereby the outer tube member 90 is easily and reliably inserted into the mounting tube 20. Moreover, since the division units 92a, 92b are connected with sufficient strength by engagement of the engaging projection 100 and the engaging receiver 106, even if external force acts thereon during storage or transportation, the connected state is less likely to be released.

Besides, the first engaging part 94 and the second engaging part 96 are provided to the axially center portion of the outer tube member 90. Thus, in comparison with the case of being provided to the axially opposite ends thereof, it is possible to effectively retain and connect the division units 92a, 92b with a small number of engaging parts 94, 96.

While the present invention has been described in detail hereinabove in terms of the embodiments, the invention is not limited by the specific disclosures thereof. For instance, the engagement structure by means of the first engaging part and the second engaging part may be provided to, for example, both the axial end face and the outer circumferential face of the outer tube member.

It would also be possible to provide the first engaging part 68 and the second engaging part 80 separately to two circumferential ends of one division unit 52a, while providing the corresponding second engaging part 80 and first engaging part 68 separately to two circumferential ends of the other division unit 52b. With this configuration, the division unit 52a and the division unit 52b may have the same structure, thereby improving productivity, facilitating management of components, and the like owing to uniformization of components.

Figure 18:
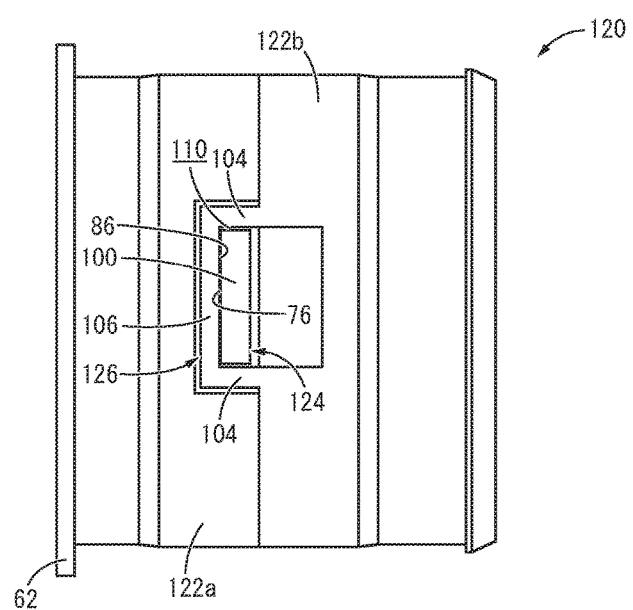
FIG. 18 is a right side view of an outer tube member constituting a differential mount as another embodiment of the present invention.

Additionally, like an outer tube member 120 depicted in FIG. 18, it would also be acceptable to connect a pair of division units 122a, 122b divided in the axial direction by means of engagement of a first engaging part 124 and a second engaging part 126 provided to the axial ends of the division units 122a, 122b. In this case as well, similarly to the preceding embodiments, with the division units 122a, 122b connected by engagement of the first engaging part 124 and the second engaging part 126, relative displacement of the division units 122a, 122b is allowed, thereby making it possible to align the division units 122a, 122b to mutually suitable positions.

The present invention is not only applied to a differential mount, but can also be applied to a tubular vibration-damping device used for engine mounts, sub-frame mounts, body mounts, and the like. In addition, the scope of application of the present invention is not limited to tubular vibration-damping devices for motor vehicles, but the present invention can be favorably adopted for tubular vibration-damping devices used for motor cycles, railroad vehicles, industrial vehicles, and the like.

What is claimed is:
1. A tubular vibration-damping device comprising:
a vibration-damping device main unit comprising an inner shaft member and a main rubber elastic body bonded to an outer circumferential surface of the inner shaft member; and an outer tube member having a tubular shape being mounted onto an outer peripheral surface of the vibration-damping device main unit in a non-adhesive way, the outer tube member comprising a pair of division units mounted onto the vibration-damping device main unit from opposite sides, the division units that are butted at each other including a first engaging part and a second engaging part provided to butted ends thereof, the first engaging part and the second engaging part being engaged with each other by approach of the division units, wherein the division units are positioned with respect to each other by engagement of the first engaging part and the second engaging part in a direction of engagement of the first engaging part and the second engaging part, the second engaging part has a frame shape, and the first engaging part is engaged with the second engaging part by being inserted into an inside of the second engaging part having the frame shape, and gaps are formed between the first engaging part and the second engaging part in an axial direction and in an axis-perpendicular direction of the division units so that the division units are allowed to undergo relative displacement.

2. The tubular vibration-damping device according to claim 1, wherein the outer tube member comprises the pair of division units mounted onto the vibration-damping device main unit from the opposite sides in the axis-perpendicular direction, and the division units that are butted at each other in a circumferential direction include the first engaging part and the second engaging part provided to circumferential ends thereof, the first engaging part and the second engaging part being engaged with each other by approach of the division units.

3. The tubular vibration-damping device according to claim 2, wherein the first engaging part and the second engaging part are provided to at least one axial end of the outer tube member, and the pair of division units that constitute the outer tube member are allowed to undergo relative displacement in the axis-perpendicular direction orthogonal to the direction of engagement of the first engaging part and the second engaging part.

4. The tubular vibration-damping device according to claim 3, wherein the first engaging part and the second engaging part are provided to each axial end of the outer tube member.

5. The tubular vibration-damping device according to claim 2, wherein the first engaging part is provided to each circumferential end of one of the division units, and the second engaging part is provided to each circumferential end of another of the division units.

6. The tubular vibration-damping device according to claim 1, wherein the first engaging part and the second engaging part are provided to a circumferential wall part of the outer tube member, and the pair of division units that constitute the outer tube member are allowed to undergo relative displacement in the axial direction orthogonal to the direction of engagement of the first engaging part and the second engaging part.

7. The tubular vibration-damping device according to claim 1, wherein the main rubber elastic body of the vibration-damping device main unit is compressed between the pair of division units, and an urging force based on elasticity of the main rubber elastic body is exerted on the division units in a direction of separation of the division units from each other.

8. The tubular vibration-damping device according to claim 1, wherein the outer tube member is made of synthetic resin.

* * * * *